Figure 3:
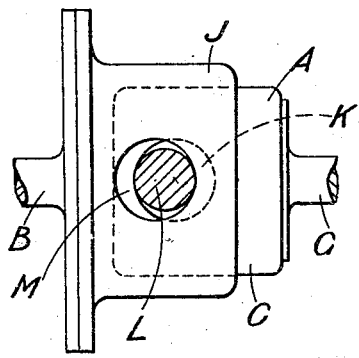

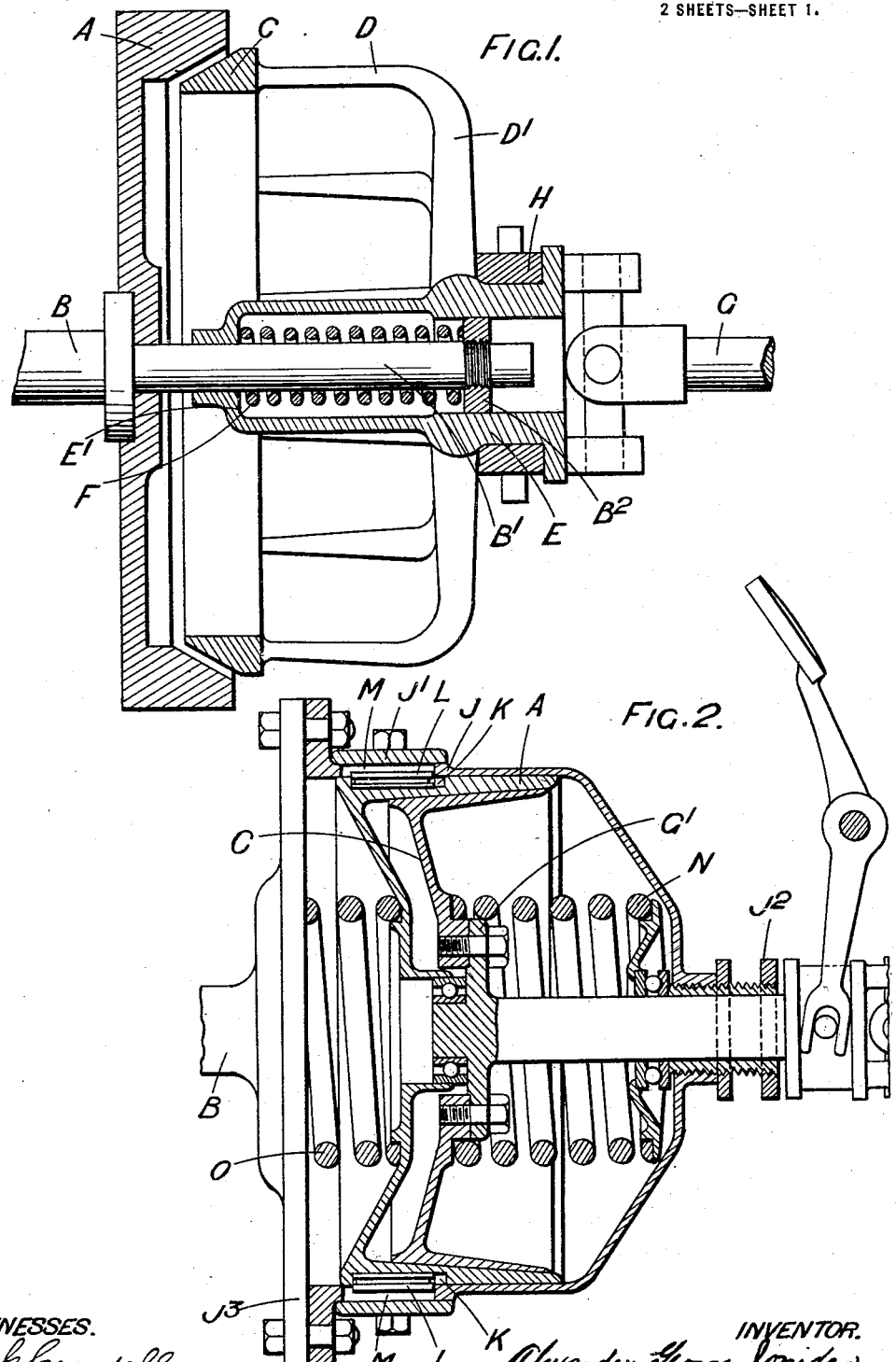

UNITED STATES PATENT OFFICE.

ALEXANDER GEORGE IONIDES, OF LEICESTER, ENGLAND.

CLUTCH FOR THE TRANSMISSION OF POWER.

1,189,113.   Specification of Letters Patent.   Patented June 27, 1916.

Application filed August 26, 1912.   Serial No. 717,013.

*To all whom it may concern:*

Be it known that I, ALEXANDER GEORGE IONIDES, a subject of the King of England, residing at Leicester, in England, have invented certain new and useful Improvements in Clutches for the Transmission of Power, of which the following is a specification.

This invention relates to clutches for the transmission of power wherein two members may be brought gradually into power transmitting engagement with each other.

A clutch constructed in accordance with this invention includes two members which are preferably rotatable in either direction, and a spring so arranged and operative on one of the members that when they are brought into frictional contact the torque transmitted by the driving member to the driven member will cause deformation of the spring, the extent of which is determined by the transmitted torque. This deformation of the spring results in a movement tending to disengage the members and this movement can be met by further movement of the engaging mechanism whereby the members are brought into close frictional contact with each other to permit the transmission of power from the driving to the driven member of the clutch. The construction and arrangement is such that the torque which can be applied is a function of the degree of movement of the engaging mechanism since the extent of the deformation of the spring is a function of the degree of movement of the engaging mechanism in addition to being a function of the torque as already mentioned. The engaging mechanism may be of any suitable type and may comprise for example the usual pedal lever employed in motor road vehicles.

In the preferred construction one of the two members is so mounted in a yielding manner and controlled by the spring that if the members are brought into contact while one member is rotating the yielding member will tend to disengage or will withdraw against the action of the spring which is deformed in the process. This tendency to disengage continues as the tendency to engage is maintained by suitable movement of the engaging mechanism until complete engagement between the members results. Within reasonable limits the action of the yielding member, or deformation of the spring tending to disengage the two members, takes place irrespective of the torque transmitted.

The relationship already mentioned as existing in this invention between the extent of deformation of the spring controlling the yielding member, the torque that can be applied and the degree of movement of the mechanism which effects and maintains engagement is important and characteristic of the present invention and constitutes a marked difference from constructions of clutch which have previously been proposed wherein one of the members was mounted in a yielding manner.

In applying the invention to a clutch of the cone type the yielding member may be mounted for example on the driven member so that it floats thereon being connected thereto by spring arms. Alternatively the yielding member is carried by the driving member and connected thereto by links which permit of the necessary yielding movement preferably against the action of a spring.

In the accompanying drawings, Figure 1 is a longitudinal sectional elevation showing the invention as applied to a clutch of the cone type. Fig. 2 is a similar view showing another embodiment of the invention. Fig. 3 shows diagrammatically in side elevation the relative positions of the clutch members of the form illustrated in Fig. 2 before engagement and the device by which the yielding or floating member is controlled, and Fig. 4 is a similar view showing the position of the parts after power transmitting engagement has been effected between the clutch members.

Like letters indicate like parts throughout the drawings.

The construction illustrated in Fig. 1 shows a simple way of applying the invention to a clutch wherein the outer conical member A is rigidly mounted on the driving shaft B. The inner conical member C is formed as a ring mounted on a series of arms D of relatively small cross sectional area to render them flexible, which lie parallel to the axis of the driving shaft B and are either arranged as parts of arms D' which radiate from a boss E or the spring members D may be carried by a disk or the like mounted on the boss E or otherwise connected to the member to be driven. The boss E is formed hollow and incloses the end B' of the driving shaft, a spring F being disposed around the end of this shaft and with one end bearing against a collar B² while the other end bears against an inturned flange E' formed on the hollow boss or casing E. The boss E is connected by a flexible coupling in some known manner to the driven shaft G. A collar or jaws H enable the boss E to be moved so as to bring the clutch member C out of engagement with the outer clutch member A, the spring F constantly tending to move the boss E so as to bring the members A and C into engagement. It is to be noted that the driven shaft G is not moved axially when the collar H is moved, there being a universal joint, of well known type, between the parts. When the contact between these two members first takes place during rotation of the member A the spring arms D yield slightly with the result that there is a partial rotation of the ring C with respect to the boss E with the result that the member C tends to disengage from the member A. If the boss E continues to be advanced so as to maintain the engagement between the members C and A, or bring them into still firmer frictional contact with each other, the yielding of the member C will still continue but to a decreasing extent up to the limit allowed by the structure of the spring arms D. Engagement between the members A and C will then be close enough to transmit power from the driving to the driven member and can be maintained irrespective of the speed of the rotating parts or the amount of power transmitted through the clutch.

Figure 4:
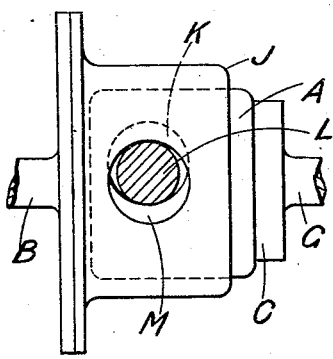

In the construction illustrated in Figs. 2, 3 and 4 the driven shaft G has rigidly mounted on a collar or flange G' formed thereon the inner clutch member C which is of the drum type having a conical engaging surface. The outer clutch member A having a conical inner face is so disposed within a fixed casing J, which incloses the whole clutch, that this clutch member A can float that is to say, can move axially within the casing J and also have a certain rotary movement relative to the casing. The floating member A is connected to the casing J in the manner hereafter described, the construction and arrangement being equivalent to links which control the floating movement of the clutch member. The connection between the floating clutch member and the casing is such that when the two clutch members are first brought into contact the floating member A is caused to turn and in so doing to withdraw slightly from engagement with the other clutch member C. As the two clutch members continue to be brought together, so does the withdrawal of the floating member A continue but to a decreasing extent, until the limit of rotary and axial movement of the floating member A has been reached by which time the engagement between the clutch members is close enough to permit the transmission of power between the two members.

In the arrangement illustrated the floating member A is connected to the casing J in the following manner:—In the cylindrical exterior of the clutch member A are formed two or more circular recesses K in each of which lies a disk L whose diameter is less than that of the recess. The thickness of each disk is such that a portion of its edge projects beyond the circumferential periphery of the clutch member A. In the casing J are formed holes M corresponding in position and number and preferably also in diameter to the recesses K in the clutch member A, each hole M however being normally eccentric to the corresponding recess K in the clutch member A the amount of eccentricity being equal to the difference between the diameter of the recess K and the disk L. That portion of each disk L which projects beyond the surface of the clutch member A lies in a corresponding hole M in the casing J, a cover plate such as J' being conveniently mounted on the casing to prevent the disks falling out of the recess.

If now owing to the clutch members being brought into contact, relative rotary movement tends to take place between the floating member A and the casing J the disks L will roll in their respective holes and recesses thereby causing the floating member A to move also axially with relation to the casing, that is to say the casing J and clutch member A will move relatively from the position shown diagrammatically in Fig. 3 to that seen in Fig. 4. This arrangement of disks is thus practically equivalent to a series of short links connecting the floating member to the casing.

The casing J is extended over the clutch member C on the driven shaft G and is preferably closed in and provided with a gland J² around the driven shaft G which enables adjustment to be effected of a spring N disposed between the gland and the driven clutch member C. This spring tends to impart axial movement to the whole casing and bring the two clutch members into engagement.

Any suitable or preferred mechanism may be employed for effecting the engagement or disengagement of the clutch members. In the preferred and more usual arrangement this result is effected by the axial movement of the inner clutch member C relatively to the shaft G, a thrust collar being formed on the shaft with which a fork engages, beyond the thrust collar the shaft G being connected to the main driven shaft by a universal joint of any well known form.

Another spring O is disposed between the floating member A and the end cover J³ of the casing, this spring tending to keep the floating member in its outermost position that is to the right as shown in Fig. 2 with relation to the casing J when the clutch members are disengaged but allowing the floating member to move and act in the manner described as soon as engagement commences.

It is to be noted that the spring O must be strong enough to stand up against positive engagement of the clutch members when effected to transmit power. That is to say, the spring O must be strong enough to extend the floating member A with reference to the casing J, or, in other words, be of sufficient strength to maintain the parts when in a state of rest in the relative position shown in Fig. 2. Moreover the spring O must be of sufficient strength to prevent the floating member A from moving under the influence of the spring N beyond the limiting point indicated in Fig. 4.

The floating or yielding member in a clutch of this type may be arranged in various ways and the manner in which the movement of this floating member is permitted and brought about may differ in accordance with requirements. In place of power being applied through the shaft B as the driving shaft and power being taken off from the shaft G as the driven shaft, power may be applied through the shaft G and taken off from the shaft B.

The details of construction may be varied to suit different requirements, the particular type specified above being merely set forth by way of example. Thus in the case of the construction illustrated in Fig. 1 in place of the inner clutch member being arranged to yield the outer clutch member may be so mounted.

What I claim as my invention and desire to secure by Letters Patent is:—

1. In a friction clutch, the combination with a drive shaft rotatable in either direction, a driven shaft rotatable in either direction, a clutch for connecting said shafts adapted to transmit power to the driven shaft from the driving shaft in either direction from power applied to the drive shaft on the same side of the clutch, said clutch consisting of two clutch members adapted to frictionally engage each other, means for moving one member relatively to the other so as to effect this engagement, and a spring controlled yielding connection between a clutch member and a shaft, the spring controlling this connection being so arranged and operated on the connected clutch member that when the two clutch members are brought into frictional contact, the torque causes deformation of the spring to an extent of which the torque is a function, this deformation of the spring resulting in a movement which causes a partial disengagement of the clutch members, which movement can be met by further operation of the engaging means for moving one clutch member relatively to the other by which further movement firm frictional contact between the members is effected, as set forth.

2. In a friction clutch, the combination with a drive shaft rotatable in either direction, a driven shaft rotatable in either direction, a clutch for connecting said shafts, adapted to transmit power to the driven shafts from the driving shaft in either direction from power applied to the drive shaft on the same side of the clutch, said clutch consisting of two members adapted to frictionally engage each other, means for moving one member relatively to the other so as to effect this engagement, and a spring controlled yielding connection between the second clutch member and the second shaft such that if the clutch members are brought into contact while one member is rotating the yieldingly mounted clutch member will tend to disengage this tendency continuing as the tendency to engage is maintained by movement of the engaging means for moving one clutch member relatively to the other until complete engagement between the clutch members results as set forth.

3. In a friction clutch, the combination with a drive shaft rotatable in either direction, a driven shaft rotatable in either direction, a clutch for connecting said shaft adapted to transmit power to the driven shaft from the driving shaft in either direction from the power applied to the drive shaft on the same side of the clutch, said clutch consisting of a fixed clutch member on the drive shaft and a floating clutch member which can frictionally engage the fixed clutch member, a spring controlled connection between the floating clutch member and the driven shaft, such that when the two clutch members are brought into frictional engagement this engagement will take place gradually but with an increasing pressure until the two members move in unison, and means for moving one clutch member relatively to the other so as to effect this engagement, as set forth.

4. In a friction clutch the combination of a clutch member mounted on a shaft rotatable in either direction, a second shaft also rotatable in either direction, an enlargement on this second shaft, a second clutch member which floats and can frictionally engage the first clutch member, a plurality of members serving as links and connecting the floating clutch member to the enlargement on the second shaft, a spring disposed between the enlargement on the second shaft and the second clutch member and operative so as to tend to maintain these parts separated to the limit allowed by the link members and means for moving one clutch member relatively to the other so as to effect engagement as set forth.

5. In a friction clutch the combination of a clutch member mounted on a shaft rotatable in either direction, a second shaft also rotatable in either direction, an enlargement on this second shaft, a second clutch member which can frictionally engage the first clutch member, a plurality of receptacles in the enlargement on the second shaft, a plurality of corresponding receptacles in the second clutch member, a plurality of link members each engaging a receptacle in the shaft enlargement and also engaging a receptacle in the second clutch member and constituting a connection between the clutch member and the shaft enlargement, a spring disposed between the enlargement on the shaft and the second clutch member and operative so as to tend to maintain these parts separated to the limit allowed by the link members and means for moving one clutch member relatively to the other so as to effect engagement as set forth.

6. In a friction clutch the combination of a clutch member mounted on a shaft rotatable in either direction, a second shaft also rotatable in either direction, an enlargement on this second shaft, a second clutch member which can frictionally engage the first clutch member, a plurality of circular receptacles in the enlargement on the second shaft, a plurality of corresponding circular receptacles in the second clutch member, a plurality of circular link members a part of each of which engages a receptacle in the shaft enlargement while another part engages a receptacle in the second clutch member each link member constituting a connection between the clutch member and the shaft enlargement which allows the movement of the clutch member relatively to the shaft and controls such movement, a spring disposed between the enlargement on the shaft and the second clutch member and operative so as to tend to maintain these parts separated to the limit allowed by the link members and means for moving one clutch member relatively to the other so as to effect engagement as set forth.

7. In a friction clutch the combination of a clutch member mounted on a shaft rotatable in either direction, a second shaft also rotatable in either direction, a casing mounted on this second shaft, a second clutch member which can frictionally engage the first clutch member, a plurality of circular receptacles in the casing, a plurality of corresponding circular receptacles in the second clutch member, a plurality of rollers part of each of which engages a receptacle in the casing while another part engages a receptacle in the second clutch member each roller constituting a connection between the clutch member and the casing which allows the movement of the clutch member relatively to the casing and controls such movement, a spring disposed between a part of the casing and the clutch member and operative so as to tend to maintain these parts separated to the limit allowed by the roller connections and spring controlled means for moving one clutch member relatively to the other so as to effect engagement as set forth.

8. The combination with a driving and a driven member adapted to be moved into power transmitting engagement with each other, of a yielding means operative, when the said members are preliminarily brought into contact with each other, to effect a disengagement of said members proportionate to the torque of the driving member, and positively-operating engaging means for the said members effective to decrease the disengaging effect upon said yielding means when moving the said members into power transmitting engagement.

9. The combination with a driving and a driven member adapted to be moved into power transmitting engagement with each other, of a spring controlled means operative, when the said members are preliminarily brought into contact with each other, to effect a disengagement of said members proportionate to the torque of the driving member, and positively operating engaging means effective to decrease simultaneously the yielding of said spring controlled means when moving the said members into power transmitting engagement.

10. In a friction clutch, the combination with clutch members movable into and out of clutching engagement with each other, operating mechanism for so moving the members, and means independent of said operating mechanism and through which means the driving torque is transmitted, acting to temporarily relieve the clutching engagement of the clutch members.

11. In a friction clutch, the combination with driving and driven members, clutch members connected with said driving and driven members, respectively, and movable into and out of clutching engagement with each other, operating means for moving the clutch members into and out of engagement with each other independently of the driving and driven members, the connection between one of said clutch members and its coöperating driving or driven member embodying parts movable angularly with relation to each other for imparting a disengaging movement to the clutch member, and means for yieldingly resisting such relative angular movement.

12. In a friction clutch, the combination with driving and driven shafts, clutch members connected respectively with the shafts and movable into and out of clutching engagement with each other, the connection between one of said clutch members and its shaft being a yielding connection, whereby a limited relative angular movement is permitted, and means embodied in said connection for temporarily relieving the clutch engagement of the members in proportion to the degree of relative angular movement.

In testimony whereof I have signed my name to this specification in the presence of two subscribing witnesses.

ALEXANDER GEORGE IONIDES.

Witnesses:
WALTER W. BALL,
F. HOOD.